(12) United States Patent
Toye

(10) Patent No.: US 8,834,987 B2
(45) Date of Patent: Sep. 16, 2014

(54) WOVEN GROUND COVER MATERIALS

(75) Inventor: Jonathan Dallas Toye, Auckland (NZ)

(73) Assignee: Extenday IP Limited, Auckland (NZ)

( * ) Notice: Subject to any disclaimer, the term of this patent is extended or adjusted under 35 U.S.C. 154(b) by 166 days.

(21) Appl. No.: 13/384,119

(22) PCT Filed: Jul. 15, 2010

(86) PCT No.: PCT/NZ2010/000147
§ 371 (c)(1),
(2), (4) Date: Feb. 21, 2012

(87) PCT Pub. No.: WO2011/008109
PCT Pub. Date: Jan. 20, 2011

(65) Prior Publication Data
US 2012/0141730 A1  Jun. 7, 2012

(30) Foreign Application Priority Data
Jul. 15, 2009  (NZ) .................................. 578427

(51) Int. Cl.
B32B 3/24 (2006.01)
E02D 17/20 (2006.01)
A01G 13/00 (2006.01)

(52) U.S. Cl.
CPC .......... A01G 13/0268 (2013.01); E02D 17/202 (2013.01)
USPC ................ 428/136; 47/31; 442/203; 442/186

(58) Field of Classification Search
CPC ................................................ A01G 13/0268
USPC ........................ 428/136; 442/203, 186; 47/31
See application file for complete search history.

(56) References Cited

U.S. PATENT DOCUMENTS

| | | |
|---|---|---|
| 316,261 A | 4/1885 | Hart, Jr. |
| 378,597 A | 2/1888 | Karmer et al. |
| 524,834 A | 8/1894 | Mayent |
| 544,971 A | 8/1895 | Donnelly |
| 568,221 A | 9/1896 | Walton |
| 621,190 A | 3/1899 | Weiss et al. |
| 823,317 A | 6/1906 | Best |
| 1,037,334 A | 9/1912 | Schneider |
| 1,737,300 A | 11/1929 | Dayton |
| 2,328,474 A | 8/1943 | Lewis |

(Continued)

FOREIGN PATENT DOCUMENTS

| | | |
|---|---|---|
| AU | 2004201984 B2 | 6/2004 |
| EP | 0114120 B1 | 7/1984 |

(Continued)

Primary Examiner — William P Watkins, III
(74) Attorney, Agent, or Firm — Hovey Williams LLP

(57) ABSTRACT

A ground cover sheet material for use in agriculture is woven from warp and weft tapes of a plastics material and at least some of the warp or weft tapes have a greater width and/or thickness than the weft or warp tapes, or the material includes a higher density of warp or weft tapes relative to the weft or warp tapes per unit area, or includes slits through the tapes, or the tapes are folded lengthwise, all optionally in one or more high water flow through lengthwise extending parts of the material. In one embodiment the material is woven from warp or weft tapes some having a rectangular or square cross-section and some having a circular or oval cross-section. In some embodiments the material is also a reflective material.

40 Claims, 13 Drawing Sheets

(56) References Cited

U.S. PATENT DOCUMENTS

| | | | |
|---|---|---|---|
| 2,459,735 A | 1/1949 | McKinnon |
| 2,680,891 A | 6/1954 | Petzke |
| 2,820,269 A | 1/1958 | Wolff |
| 2,900,692 A | 8/1959 | Lincoln |
| 3,503,106 A | 3/1970 | Port et al. |
| 3,970,227 A | 7/1976 | Hardy |
| 3,990,650 A | 11/1976 | Devine |
| 4,236,688 A | 12/1980 | Wilk |
| 4,649,954 A | 3/1987 | Dunwoody |
| 4,979,714 A | 12/1990 | Russell et al. |
| 5,056,247 A | 10/1991 | Loomie |
| 5,067,205 A | 11/1991 | Chen et al. |
| 5,406,680 A | 4/1995 | Silverberg |
| 5,465,596 A | 11/1995 | Park |
| 5,546,639 A | 8/1996 | Lacore et al. |
| 5,638,584 A | 6/1997 | De Anfrasio |
| 6,014,794 A | 1/2000 | McCoy |
| 6,081,975 A | 7/2000 | Norrby |
| 6,122,806 A | 9/2000 | Umezawa et al. |
| 6,339,898 B1 | 1/2002 | Toye |
| 6,647,662 B2 | 11/2003 | Toye |
| 6,823,565 B2 | 11/2004 | Toye |
| 7,195,256 B2 | 3/2007 | Toye et al. |
| 7,207,136 B2 | 4/2007 | Hinsperger |
| 2004/0176007 A1* | 9/2004 | Braekevelt | 442/229 |
| 2005/0050793 A1 | 3/2005 | Johnson et al. |
| 2006/0003653 A1 | 1/2006 | Hart, Sr. et al. |
| 2007/0266624 A1 | 11/2007 | Tanaka |
| 2007/0266625 A1 | 11/2007 | Markis et al. |
| 2011/0314731 A1* | 12/2011 | Toye | 47/31 |

FOREIGN PATENT DOCUMENTS

| | | |
|---|---|---|
| EP | 0206304 A1 | 12/1986 |
| EP | 1728417 A2 | 12/2006 |
| FR | 2352204 | 12/1977 |
| FR | 2404759 | 4/1979 |
| GB | 2134938 A | 8/1984 |
| JP | 2008022796 A | 2/2008 |
| JP | 2008148592 A | 7/2008 |
| WO | 98/41769 A1 | 9/1998 |
| WO | 98/41770 A1 | 9/1998 |
| WO | 01/06840 A1 | 2/2001 |
| WO | 2006/009479 A1 | 1/2006 |

* cited by examiner

WOVEN GROUND COVER MATERIALS

This is a national stage application in the United States of International Application No. PCT/NZ2010/000147 filed 15 Jul. 2010, which claims priority to New Zealand application no. 578427 filed 15 Jul. 2009, the entire disclosures of which are incorporated herein by reference.

FIELD OF THE INVENTION

The invention relates to woven ground cover materials.

BACKGROUND TO THE INVENTION

Ground cover materials are used in agriculture for a number of purposes including weed suppression and/or soil warmth retention and/or moisture retention and/or for light reflecting.

Typically where a material is used for weed suppression (herein referred to as weed matting) in an orchard or vineyard for example, the material is rolled out in lengths onto the ground beneath or between rows of trees or vines, or rows of berry fruit plants, and is secured in place. It is important that the material while suppressing weed growth beneath the material also allows rain or irrigation water penetration through the material.

Typically where a material is used primarily as a reflective ground cover for light enhancement, the material is again rolled out in lengths onto the ground, and secured in place, beneath or between rows of trees, vines, or plants, to increase the amount of light to which the plants and in particular fruit are exposed by reflection of light from the material towards the fruit above.

In either case the material may also aid soil warmth retention.

The sheet material will typically remain in place for some months, before being removed and reused in a subsequent growing season or on another crop in the same growing season, but in some cases may remain in place over multiple growing seasons.

It is an object of the present invention to provide improved ground cover materials, or to at least provide the public with a useful choice.

SUMMARY OF THE INVENTION

In a first aspect, the invention comprises a ground cover sheet material woven from warp and weft tapes of a plastics material wherein at least some of the warp tapes have a greater width than the weft tapes or at least some of the weft tapes have a greater width than the warp tapes.

In some embodiments the warp tapes have a greater width in one or more lengthwise extending strip portions of the material than the warp tapes in one or more other lengthwise extending strip portions of the material.

In some embodiments a major fraction of the warp or weft tapes have a greater width than the weft or warp tapes. In other embodiments substantially all of the warp or weft tapes have a greater width than the weft or warp tapes.

In some embodiments the width of the warp or weft tapes is at least 50% or 100% one to ten times or more greater than the width of the weft or warp tapes.

In some embodiments also at least some, a major fraction, or substantially all of the warp tapes have a greater thickness than the weft tapes or at least some, a major fraction, or substantially all of the weft tapes have a greater thickness than the warp tapes. For example, in some embodiments at least a major fraction of the warp tapes have a greater width and smaller thickness than the weft tapes such that the weft tapes are narrower and thicker than the warp tapes, or vice versa. The thickness differential of the tapes may comprise any one or more of the features defined in respect of the second aspect of the invention.

Additionally, at least some, a major fraction or substantially all of the warp and/or weft tapes may comprise slits through the tapes lengthwise of the tapes. The slitted tapes may comprise any one or more of the features defined in respect of the third aspect of the invention.

In a second aspect, the invention comprises a ground cover sheet material woven from warp and weft tapes of a plastics material wherein at least some of the warp tapes have a greater thickness than the weft tapes or at least some of the weft tapes have a greater thickness than the warp tapes.

In some embodiments the warp tapes have a greater thickness in one or more lengthwise extending strip portions of the material than the warp tapes in one or more other lengthwise extending strip portions of the material.

In some embodiments a major fraction of the warp or weft tapes have a greater thickness than the weft or warp tapes. In other embodiments substantially all of the warp or weft tapes have a greater thickness than the weft or warp tapes.

In some embodiments the thickness of the warp or weft tapes is at least 50% or 100% or one to ten times or more greater than the thickness of the weft or warp tapes.

In some embodiments also at least some, a major fraction, or substantially all of the warp tapes have a greater width than the weft tapes or at least some, a major fraction or substantially all of the weft tapes have a greater width than the warp tapes. For example, in some embodiments at least a major fraction of the warp tapes have a greater width and smaller thickness than the weft tapes such that the weft tapes are narrower and thicker than the warp tapes, or vice versa. The width differential of the tapes may comprise any one or more of the features defined in respect of the first aspect of the invention.

Additionally, at least some, a major fraction, or substantially all of the warp and/or weft tapes comprise slits through the tapes lengthwise of the tapes. The slitted tapes may comprise any one or more of the features defined in respect of the third aspect of the invention.

In a third aspect, the invention comprises a ground cover sheet material woven from warp and weft tapes of a plastics material wherein at least some of the warp and/or weft tapes comprise slits through the tapes lengthwise of the tapes.

In some embodiments at least some of the warp and/or weft tapes comprise slits through the tapes lengthwise of the tapes in one or more lengthwise extending strip portions of the material than the warp and/or weft tapes in one or more other lengthwise extending strip portions of the material.

In some embodiments the tapes with slits through the tapes may comprise multiple parallel or approximately parallel slits.

The slits are shorter than the full length of the tape and in some embodiments may be of length in the range 1-20 mm, 1-10 mm, 5-15 mm, 2-8 mm, 9-11 mm, or 4-6 mm.

In some embodiments the length of spacing between slits may be in the range of 1-20 mm, 2-10 mm, or 4-6 mm.

In some embodiments, the slits are aligned with respect to their position across the width of the tape. If there are slit groups, each slit may be aligned with the corresponding slits of the remaining slit groups in the series. In other embodiments, the slits may not be aligned and could be staggered slits or in a random pattern along the length of the tape.

In a fourth aspect, the invention comprises a ground cover sheet material woven from warp and weft tapes of a plastics material wherein at least some of the warp and or weft tapes comprise slits through the tapes lengthwise of the tapes and wherein at least some of the warp tapes have a greater width than the weft tapes or at least some of the weft tapes have a greater width than the warp tapes.

In a fifth aspect, the invention comprises a ground cover sheet material woven from warp and weft tapes of a plastics material wherein at least some of the warp and or weft tapes comprise slits through the tapes lengthwise of the tapes and wherein at least some of the warp tapes have a greater width than the weft tapes or at least some of the weft tapes have a greater thickness than the warp tapes.

In a sixth aspect the invention comprises a ground cover sheet material woven from warp and weft tapes of a plastics material, the warp and weft tapes having substantially the same width, wherein at least some of the warp and/or weft tapes comprise slits through the tapes lengthwise of the tapes.

In a seventh aspect, the invention comprises a ground cover sheet material woven from warp and weft tapes of a plastics material, the warp and weft tapes having substantially the same width and/or thickness, and wherein at least some of the material comprises a higher density of weft tapes relative to the warp tapes per unit area or a higher density of warp tapes relative to the weft tapes per unit area.

In some embodiments the material comprises a higher density of weft tapes relative to the warp tapes per unit area or a higher density of warp tapes relative to the weft tapes per unit area in one or more lengthwise extending strip portions of the material than in one or more other lengthwise extending strip portions of the material.

In an eighth sixth aspect the invention comprises ground cover sheet material woven from warp or weft tapes of a plastics material some having a rectangular or square cross-section and weft or warp tapes of a plastics material some having a circular or oval cross-section.

In some embodiments the material is woven from warp or weft tapes of a plastics material a majority or substantially all having a rectangular or square cross-section and weft or warp tapes of a plastics material a majority or substantially all having a circular or oval cross-section.

In some embodiments of the material of each of the above aspects of the invention the material is woven with a weave of tightness such that at least some, or at substantially all crossings of warp and weft tapes of the material the warp and weft tapes are at least butted against each other, or are pushed (or crammed) against each other, such that at least some of the warp and/or weft tapes are partly folded lengthwise (but for lateral apertures through the material as referred to further below).

In some embodiments said crossings of warp and weft tapes at which the warp and/or weft tapes are partly folded lengthwise are in one or more lengthwise extending strip portions of the material.

In some embodiments the ground cover sheet material comprises 150% more weft or warp tapes than warp or weft tapes respectively per unit area, or 5-40% more weft or warp tapes than warp or weft tapes, or 10-30% more weft or warp tapes than warp or weft tapes, or 15-20% more weft or warp tapes than warp or weft tapes.

In one embodiment, the density of the warp tapes is such that the average number of tapes per unit area is substantially the quotient of the tape width by the unit length/width of the unit area such that when woven the warp tapes butt against each with the tapes remaining flat and with minimal lengthwise folding of the tapes. The higher relative density and cramming of weft tapes is such that it causes the weft tapes, once woven, to curve or partially fold along their length, relative to their flat rest lengthwise profile by buckling, scrunching, squeezing, partially or completely folding or creating a lengthwise camber. Effectively, the cramming of the weft tapes increasing the apparent in-situ thickness profile of the weft tapes and reduces the apparent in-situ width profile of the weft tapes. In an alternative embodiment, the vice versa characteristics apply when the warp tapes have a higher density relative to the weft tapes.

In an alternative embodiment, the density of the weft tapes is such that the average number of tapes per unit area is substantially the quotient of the tape width by the unit length/width of the unit area such that when woven the weft tapes butt against each with the tapes remaining flat and with minimal lengthwise folding of the tapes. The higher relative density and cramming of warp tapes is such that it causes the warp tapes, once woven, to curve or partially fold along their length, relative to their flat rest lengthwise profile by buckling, scrunching, squeezing, partially or completely folding or creating a lengthwise camber. Effectively, the cramming of the warp tapes increasing the apparent in-situ thickness profile of the warp tapes and reduces the apparent in-situ width profile of the warp tapes.

In a ninth aspect the invention comprises ground cover sheet material woven from warp and weft tapes of a plastics material, the warp and weft tapes having substantially the same width, wherein at a majority of crossings of warp and weft tapes the warp and/or weft tapes are partly folded lengthwise.

The term "density" as used in this specification, unless the context suggests otherwise, is intended to mean the average number of weft or warp tapes woven to form the material per unit area, such as per $25.4 \text{ mm}^2$ ($\text{inch}^2$), or alternatively the average number of weft or warp tapes woven to form the material per unit length, such as per 25.4 mm (inch).

In some embodiments the material may have a porosity of less than 10%, less than 5%, less, than 3%, or less than 1%. The term "porosity" as used in this specification is intended to mean the area of the holes or apertures directly through the material perpendicular to the plane of the material (and excluding lateral apertures through the material not apparent when the material is viewed from a direction perpendicular to the plane of the material) between the warp and weft tapes of the material relative to the whole surface area of the material, expressed as a percentage. For example, a material having warp and weft tapes spaced apart from each other so that the air space between the warp and weft tapes constitutes 10% per square meter surface area of the material will have a porosity of 10%. The porosity is made up of small evenly spaced apertures rather than large holes.

The term "reflective" as used in this specification is intended to mean that the material is reflective of at least 50% or alternatively at least 55% or alternatively at least 60% of visible light on at least one side of the material. In one embodiment of a reflective material the material may reflect at least 40% solar radiation on average across the UV (wavelength about 280-400 nm), visible (wavelength about 400-700 nm) and very near infrared (wavelength about 700-800 nm) ranges, and which transmits at least 10% or 5% on average of solar radiation across the wavelength range about 800-2500 nm. The material may reflect more solar radiation than it transmits and absorbs in the UV, visible, and very near infrared ranges. The material may transmit at least 15% or at least 20% of solar radiation on average in the wavelength range about 800-2500 nm. Some or all tapes of a reflective material may be formed from a resin comprising a white pigment, which resin has been formed by mixing a masterbatch consisting essentially of 20 to 90% by weight of a white pigment or combination of pigments chosen from zirconium, strontium, barium, magnesium, zinc and calcium pigments, and a first polymer, with a second polymer such that the resin (masterbatch) comprising the white pigment comprises between about 5 to 50% by weight of the total mixture. In certain embodiments the white pigment may be selected from zirconium, dioxide, magnesium, zirconate, calcium zirconate, strontium zirconate, barium zirconate, zirconium silicate, zinc sulphide, calcium carbonate, barium sulphate, magnesium oxide, strontium carbonate, barium carbonate, and potassium titantae.

In some embodiments the material may incorporate a compound or compounds added to cause or increase the extent to which the material reflects and/or absorption of radiation from the earth (terrestrial (long wave or infrared) radiation). Thus when the material is placed over or adjunct to plants it will assist in retaining heat beneath the material, which may be desirable for some plants or applications.

In some embodiments the material may incorporate a compound or compounds added to cause or increase the extent to which the material allows transmission and/or absorption of radiation from the earth (terrestrial (long wave or infrared) radiation). Thus when the material is placed over or adjacent to plants it will assist in releasing the heat beneath the material, which may be desirable for some plants or applications.

In other embodiments the material may incorporate a compound or compounds added to cause or increase the extent to which the material reflects and/or absorbs solar radiation. Thus when the material is placed over or adjunct to plants it will assist in cooling beneath the material, which may be desirable for some plants or applications.

In other embodiments the material may incorporate a compound or compounds added to cause or increase the extent to which the material allows transmission and/or absorption of solar radiation. Thus when the material is placed over or adjunct to plants it will assist in increasing the heat beneath the material, which may be desirable for some plants or applications.

The material of the invention may be formed with a tight weave so as to have high weed suppression characteristics (by low light transmission) and/or high reflectivity while still allowing water penetration, and also air movement between the ground and the air above the ground cover.

The term "tape" or "tapes" is intended to include longitudinally extending single filament elements having four sides when viewed in cross-section, such as a rectangular or square cross-section, also longitudinally extending elements having a multisided cross-section such as a triangular or hexagonal cross-section for example, and also longitudinally extending elements having a circular or oval or similar cross-section (sometimes referred to hereafter as monofilament). The tapes may be formed from any suitable polyolefin such as polyethylene or polypropylene, for example, or a mixture thereof, or an ethylene alpha-olefin, or a polyester, or a biopolymer, or a blend of any of the foregoing. Certain plastics are particularly useful when present as minor or major components. Ethylene vinyl acetate (EVA), ethylene butyl acrylate (EBA) and ethylene methyl acrylate (EMA) are useful for imparting elasticity and other properties. Polyesters and polystyrene, styrene-butdienie (SB), acrylonitrile-butadienie-styrene (ABS), styrene-acrylonitrile (SAN), polyethylenie terephithialate (PET), polymethylmethacrylate (PMMA) and polycarbonate are useful as dye carriers and also for influencing radiation (reflecting, absorbing and transmission) properties and also other properties on the materials. Starch and other plant polymers are useful to increase biodegradability. Alternatively the tapes may comprise in part or whole of paper, wood or cellulose fibre, starch based polymers, casein, latex or in any combination of the above and/or with petroleum derived plastic polymers. The polymer or polymer blend may incorporate agents such as one or more pigments, UV stabilisers, or processing aids.

Typically sheet materials of the invention will be laid out in lengths on the ground between or beneath rows of the crop being grown, which may be trees, vines, bushes etc, and the materials are referred to in the specification as "ground cover sheet materials". It is possible however that the materials may be suspended or positioned above the ground in a vertical or angled position to reflect the solar radiation onto the crop, for example on either side of the crop row, for example trees, and the expression "ground cover sheet material" is intended to encompass materials for such applications also.

The term "comprising" as used in this specification means "consisting at least in part of". When interpreting each statement in this specification that includes the term "comprising", features other than that or those prefaced by the term may also be present. Related terms such as "comprise" and "comprises" are to be interpreted in the same manner.

BRIEF DESCRIPTION OF THE DRAWINGS

Preferred embodiments of the invention will be further described by way of example only and with reference to the accompanying drawings, in which.

DETAILED DESCRIPTION OF PREFERRED EMBODIMENTS

General

Figure 1:
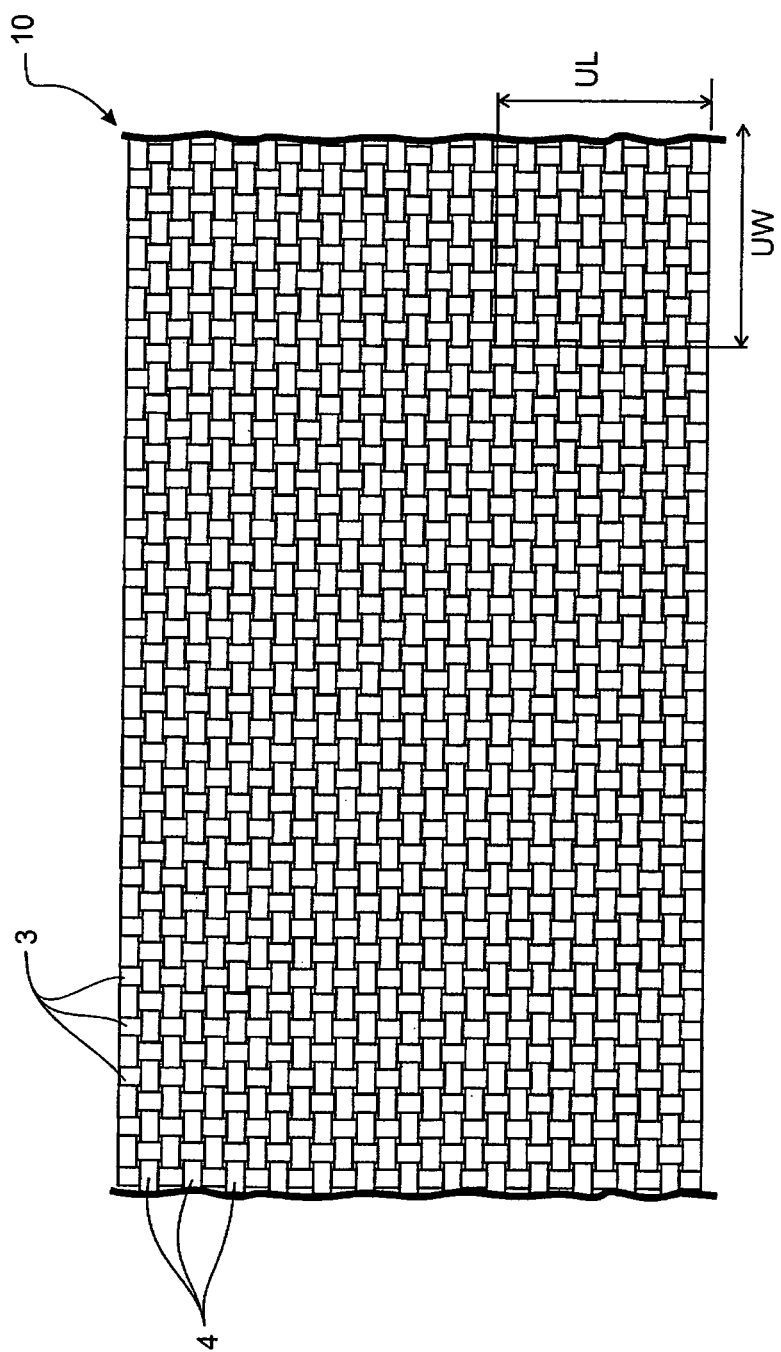
FIG. 1 is a schematic stylised plan view of a section of ground cover material of the invention, woven with warp and weft tapes.

FIG. 1 shows a section of ground cover material or sheeting 10. The material 10 is woven from flat warp 3 and weft 4 tapes of a plastics material. The tapes may be formed by extruding a film material from a polymer resin and then cutting the film into tapes which are in turn used to weave the material, or by extruding individual tapes. The tapes may be formed from a polymer containing pigments which give the ground cover material desired properties, such as desired light reflective, absorptive and/or transmission properties for example.

Figure 2:
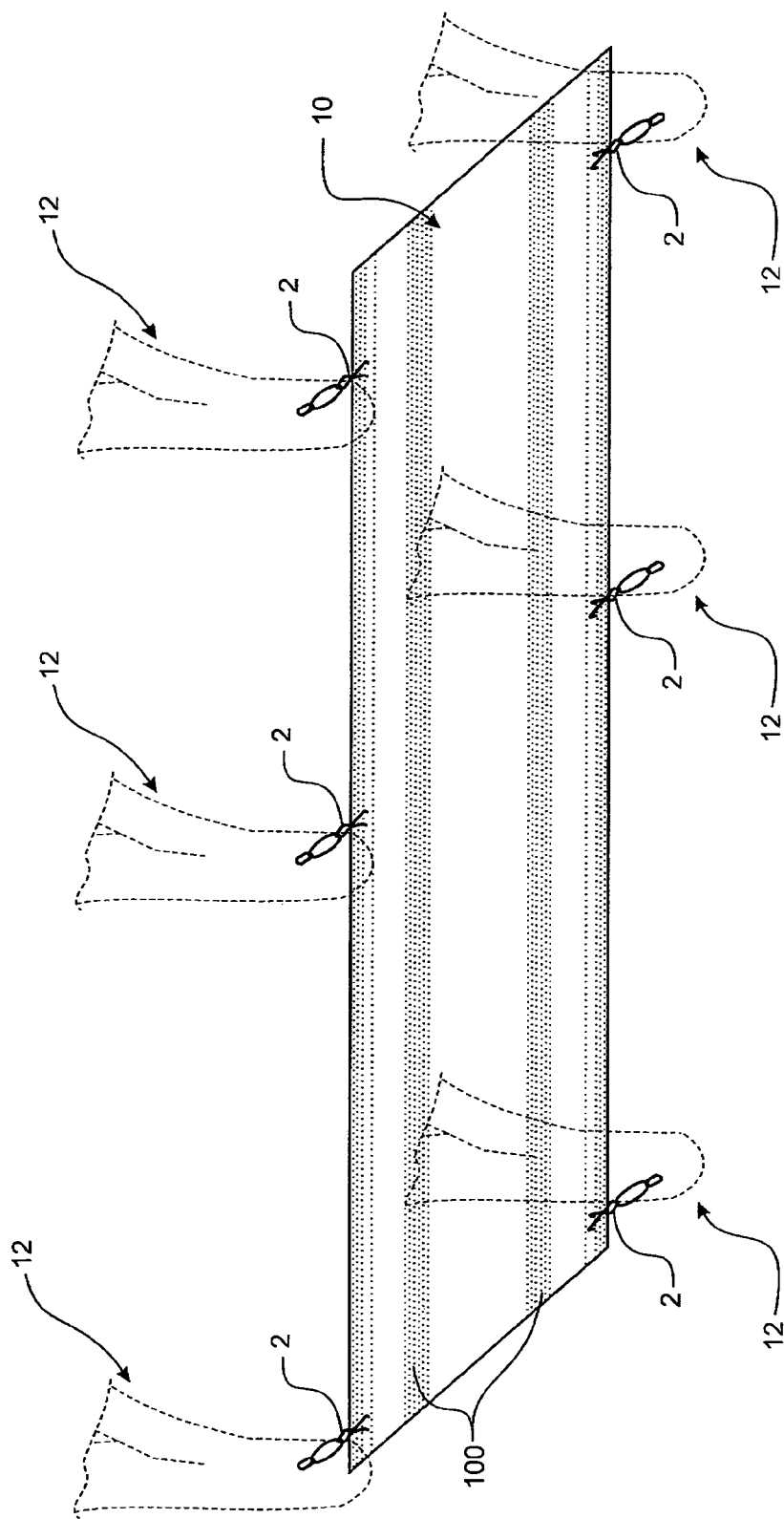
FIG. 2 is a perspective view of the woven ground cover material of the invention fixed between two rows of trees.
Figure 3A:
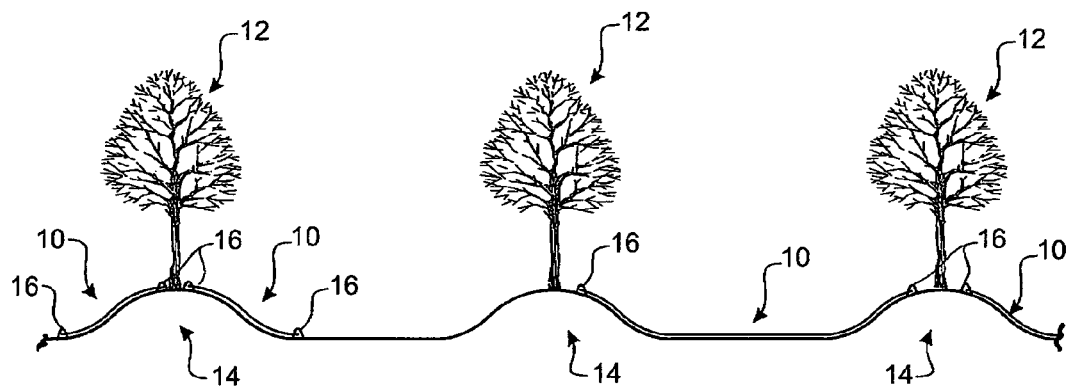
FIG. 3A is an elevation view of woven ground cover materials of the invention fixed to the ground between rows of trees or crops growing on mounded soil.
Figure 3B:
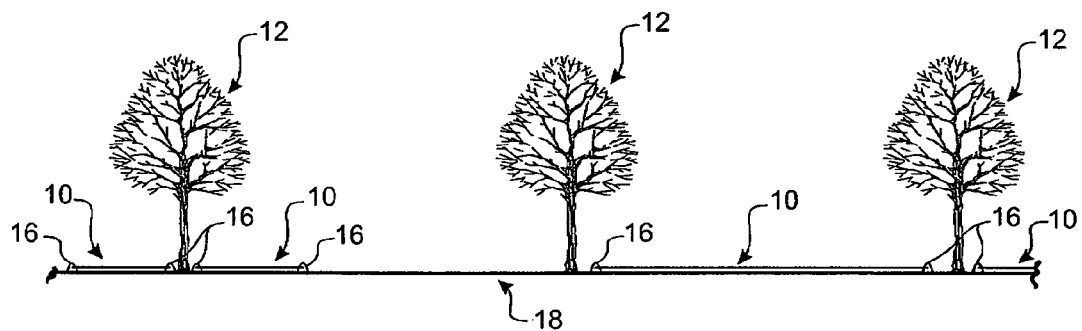
FIG. 3B is an elevation view of woven ground cover materials of the invention fixed to the ground between rows of trees or crops growing on flat soil.
Figure 3C:
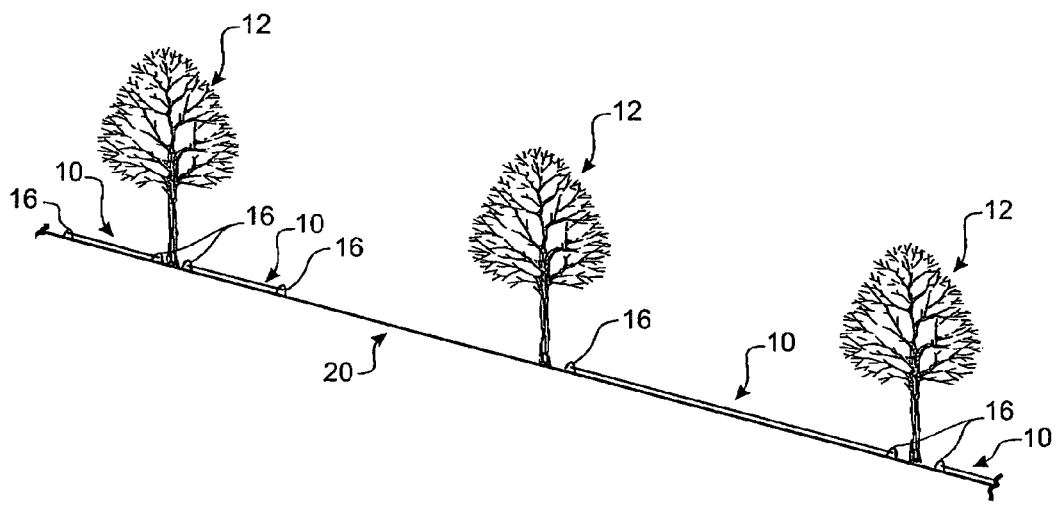
FIG. 3C is an elevation view of woven ground cover materials of the invention fixed to the ground between rows of trees or crops growing on sloping soil.

Typically the material has a greater length than width and is provided as a roll or in concertina folded form and referring to FIGS. 2-3c, lengths of the ground cover material 10 can be fixed between or beneath rows of crops, for example fruit trees 12, in various ways, depending on the primary function of the ground cover material, for example weed suppression and/or light reflectivity, and the surface profile of the ground soil underneath. Some of the various options and configurations will be described by way of example only.

FIG. 2 shows the ground cover material 10 positioned over the ground between and beneath rows of orchard trees 12. To anchor the material in place, optionally fastening claws 2 connect to the sheeting along its edges, and in turn may connect by loops or lengths of extensible or optionally inextensible material to staples hammered into the spaced trees as shown, or alternatively to stakes or pegs hammered into the ground, or to a wire extending along the row of the trees or vines, for example. The material may be anchored on or close to the ground, where the material is weed matting for example, or over but above the ground where the material is a reflective material provided to reflect solar radiation onto the fruit trees and fruit from below.

FIG. 3a shows lengths of ground cover material 10 laid on the ground underneath a tree (left) and between rows of orchard trees 12 (right). The orchard trees 12 in this form are grown on rows of mounded soil 14, and the lengths of material 10 are fixed peripherally along each side into the ground by stakes or pegs 16. FIG. 3b shows a similar fixing configuration for lengths of ground cover material laid on flat ground soil 18, and FIG. 3c shows use of the ground cover material on a sloped ground surface 20. It will be appreciated that the ground cover materials may be employed on any type of profile of ground surface, whether flat, mounded, sloped, undulating, contoured or a combination of these.

Figure 4A:
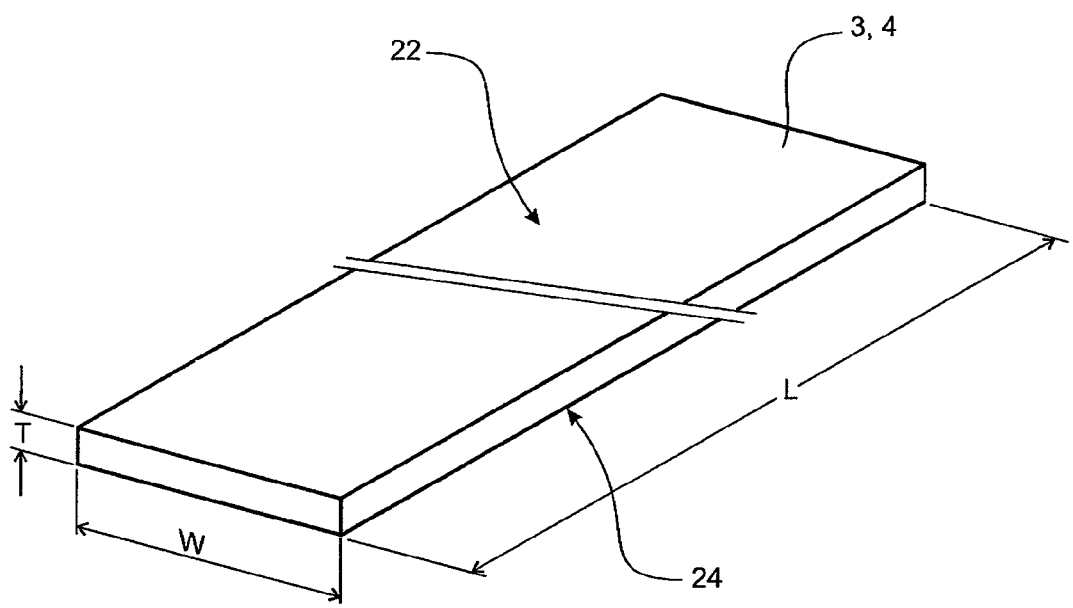
FIGS. 4A and 4B are schematic perspective views showing the typical defining dimensions of rectangular and circular cross-section warp or weft tapes used to weave the ground cover materials of the invention.
Figure 4B:
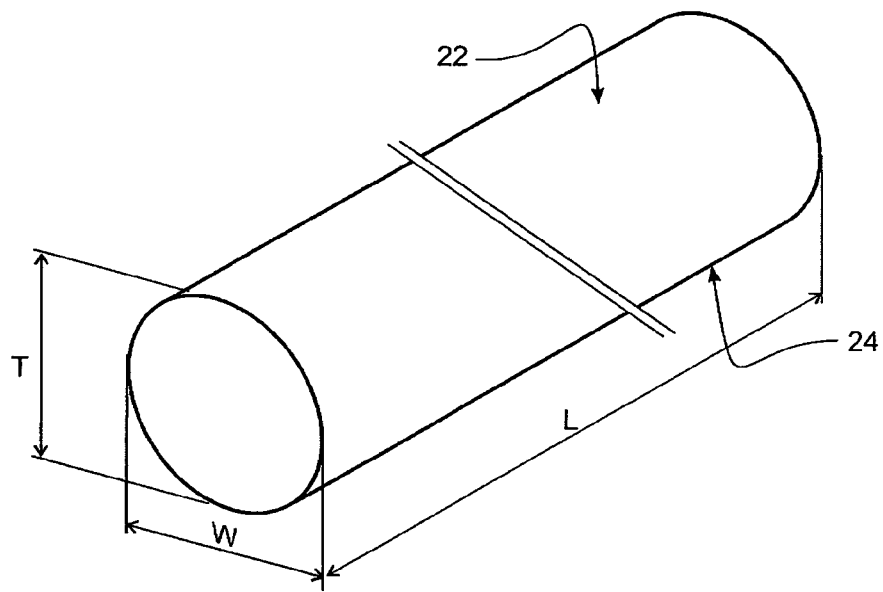

FIGS. 4A and 4B show dimensional, profiles and/or shapes of substantially rectangular and circular cross-section warp and/or weft tapes which may be used to weave the ground cover material, for the purpose of further explanation of the various embodiments of the ground cover material. The warp and/or weft tapes have an indefinite length, designated by reference double-ended arrow L. The top and bottom surfaces 22 and 24 of the tape form the top and bottom surfaces of the ground cover material once woven. In this form the tapes are substantially rectangular in cross-section and have a width, designated by double-ended arrow W, and a thickness, designated by double-ended arrow T. It will be appreciated that the width and thickness of the tapes are substantially uniform along the length of the tape. In other forms the tapes may have different cross-section shapes as referred to previously.

Differential Tape Width Embodiments

Figure 5:
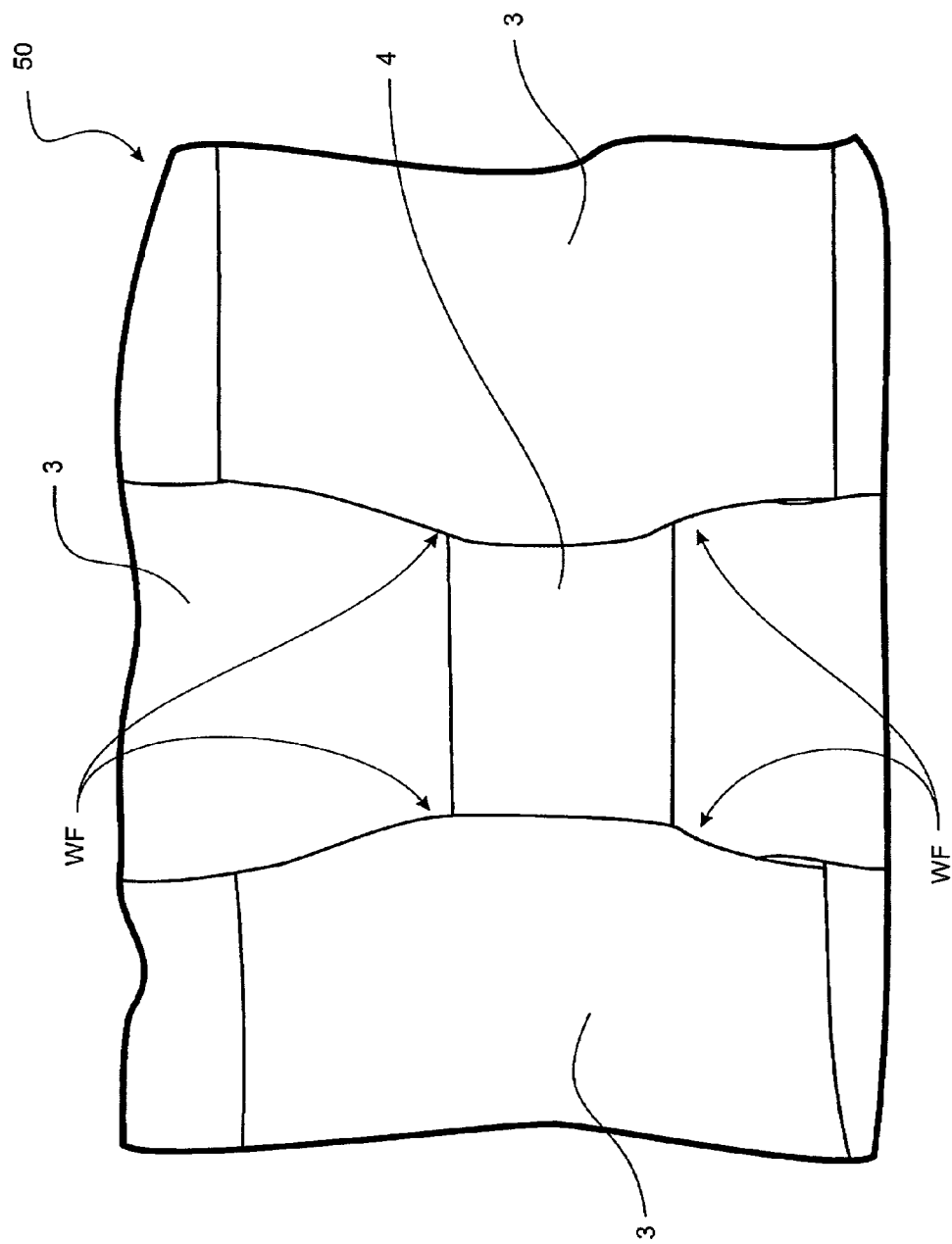
FIG. 5 is a very close up plan view of a section of one embodiment of a ground cover material of the invention in which there is a width differential between at least some of the warp and weft tapes.

FIG. 5 is a very close up view of a section of one embodiment of a ground cover material 50 of the invention. In this embodiment the warp tapes 3 have a greater width (W) than the Weft tapes 4, and also the weft tapes 4 may optionally have a greater thickness than the warp tapes 3. In FIG. 5 three warp tapes 3 and one weft tape 4 are visible. FIG. 5 shows a crossing between the weft tape 4 and the three warp tapes 3. The material is also woven with a weave of tightness such that the edges of the warp and weft tapes are at least butted, or are crammed against each other (as subsequently described further), as shown.

Viewed from a direction perpendicular to the plane of the material, the material has minimal porosity and few if any apertures through the material are apparent when the material is viewed from a direction perpendicular to the plane of the material. The material is thus therefore highly effective as a weed suppressant, or in a reflective application provides a maximum reflective surface area, or may be useful for both. However at the same time the difference in width between the warp and weft tapes, along with the tight weave of the material, creates apertures substantially laterally between the warp and weft tapes, through the material, at each warp-weft crossing, through which water can flow. For example in FIG. 5 water can flow through lateral apertures not visible but indicated by arrows WF, between the portion of the middle warp tape 3 shown, and the narrower weft tape 4, and beneath the side warp tapes 3. The material thus is effective to allow high flow of rain or irrigation water from the top surface of the material in use through the material to the ground below.

At least some of the warp tapes have a greater width than the weft tapes. In one form, all the warp tapes have a greater width, but alternatively for example only every second or third warp tape may have a greater width than the weft tapes.

In the example shown, the warp tapes have a greater width than the weft tapes. However, in an alternative form at least some of the weft tapes may have a greater width than the warp tapes, thereby creating similar substantially lateral water flow apertures, WF, aligned with the narrower warp tapes, at the warp and weft tape crossings.

In the example shown the warp and weft tapes have a rectangular cross-section but in an alternative embodiment the warp or weft tapes may have a rectangular cross-section as shown, of width W, and the weft or warp tapes may have a circular or oval cross-section of a width (or diameter for a circular cross-section) less or greater than W.

Differential Tape Thickness Embodiment

Figure 6:
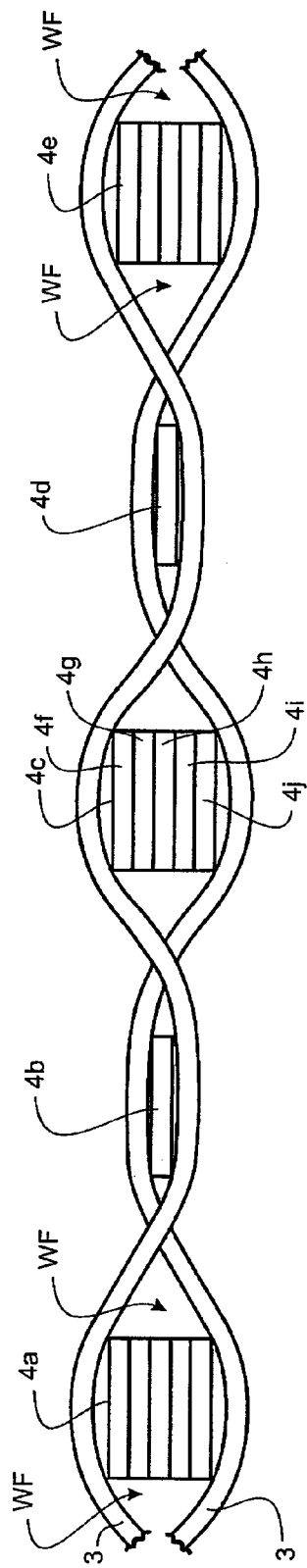
FIG. 6 is a close up cross-section view of one embodiment of a ground cover material of the invention in which there is a thickness differential between at least some of the warp and weft tapes.
Figure 7:
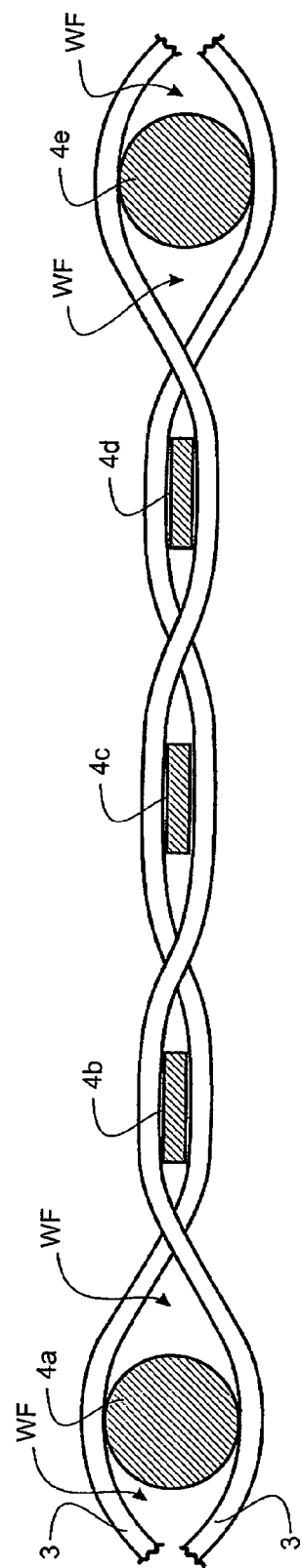
FIG. 7 is a close up cross-section view of a section of another embodiment of a ground cover material of the invention in which there is a thickness differential between at least some of the warp and weft tapes.

FIGS. 6 and 7 are close up cross-section views of two forms of a ground cover material in which the warp tapes 3 have only a greater thickness (T) than the weft tapes 4. This thickness differential also creates substantially lateral apertures WF the material aligned with the warp tapes through which water can flow at the warp and weft tape crossings, similar to those created by the differential width embodiment described above. Again, the material is also preferably woven with a weave of tightness such that the edges of the warp and weft tapes are at least butted, or are crammed against each other, as shown.

FIG. 6 is a cross-section view of a material of this embodiment woven with tapes having a rectangular cross-section (as in FIG. 4A) and in which every alternate warp tape 4 has a five times greater thickness than the weft tapes 3 and also greater than the other warp tapes which have a thickness similar to the weft tapes 3, which is achieved by forming every alternate warp tape 4 of five rectangular filaments 4f-4j stacked i.e. each of the filaments 4f-4j has the same width W as the width of the resulting composite warp tape 4 but each has a thickness T of only ⅕ of the total thickness T of the composite warp tape. The thickness differential between the thicker warp tapes and the weft tapes creates substantially lateral apertures WF either side of each thicker warp tape between adjacent weft tapes through which water can flow at the warp and weft tape crossings. Instead of every alternate warp tape being thicker as in the example of FIG. 6 all warp tapes or less than every alternate warp tape may have increased thickness. Also alternatively the alternate warp tapes 4 shown as each comprising five individual rectangular filaments stacked may instead comprise a single filament having a thickness T five times its width W. The thickness of the warp (or weft) tapes may be more or less than five times that of the weft (or warp) tapes. In an alternative form the weft tapes 3 instead of the warp tapes 4 may have such increased thickness. Where the warp or weft tapes with greater thickness comprise multiple individual filaments in such embodiments the warp or weft tapes with greater thickness may be composed of between 2 and 12, 4 and 8, or 5 or 6 individual filaments.

In a further form the warp or weft tapes may comprise rectangular or square or other cross-section shape tapes of a similar thickness as the weft or warp tapes (or greater thickness) twisted along their length so that they have increased thickness. Again every warp or weft tape or only some warp or weft tapes may be so twisted.

FIG. 7 is a cross-section view of a section of material woven with weft tapes 3 having a rectangular cross-section (as in FIG. 4A) and every fourth warp tape (or every 1 in 100 tapes or 1 in 50 tapes or 1 in 25 tapes or 1 in 10 tapes) such as warp tapes 4a and 4b shown have a circular cross-section (as in FIG. 4B) i.e. a monofilament plastics material, and in which the circular cross-section warp tapes 4a and 4e have a thickness T which is again five times the thickness of that of the weft tapes 3 and also greater than other warp tapes 4b-4d which have a rectangular cross-section and also a thickness similar to the weft tapes 3. The thickness differential between the thicker warp tapes and the weft tapes creates substantially lateral apertures WF either side of each thicker warp tape (4a and 4e) between adjacent weft tapes through which water can flow at the warp and weft tape crossings. Instead of every fourth warp tape being thicker as in the example of FIG. 7 more or less than every fourth warp tape including all warp tapes may have increased thickness. In an alternative form the weft tapes 3 instead of the warp tapes 4 may be formed from thicker monofilament. In an alternative form the monofilament may have an overall or other non-rectangular cross-section.

Again, viewed from a direction perpendicular to the plane of the material, the materials of FIGS. 6 and 7 may have minimal porosity and few if any apertures through the material are apparent. The material is thus therefore highly effective as a weed suppressant, or in a reflective application provides a maximum reflective surface area, or may be useful for both. However at the same time the difference in thickness between the warp and weft tapes, along with the tight weave of the material, creates apertures laterally between the warp and weft tapes, through the material, at each warp-weft crossing, through which water can flow. For example in FIGS. 6 and 7 water can flow through lateral apertures not visible but indicated by arrows WF, between the portion of the middle warp tape 3 shown, and the narrower weft tape 4, and beneath the side warp tapes 3. The material thus is effective to allow high flow of rain or irrigation water from the top surface of the material in use through the material to the ground below.

In the examples shown, the warp tapes have a greater thickness than the weft tapes. However, in an alternative form at least some of the weft tapes may have a greater thickness than the warp tapes, thereby again creating substantially lateral water flow apertures, aligned with the thicker weft tapes, at the warp and weft tape crossings.

The tapes of differential thickness may be used with tapes of differential width as described with reference to the differential tape width embodiment. For example, in some forms, at least some of the warp tapes have a greater width and smaller thickness than the weft tapes such that the weft tapes are narrower and thicker than the warp tapes, or vice versa. This combination of differential width and differential thickness may also enhance the form of the lateral water flow apertures created at the warp and weft tape crossings. Additionally, the material may also be woven with a weave of tightness such that the edges of the warp and weft tapes are at least butted, or are crammed against each other (as subsequently described further).

Figure 10:
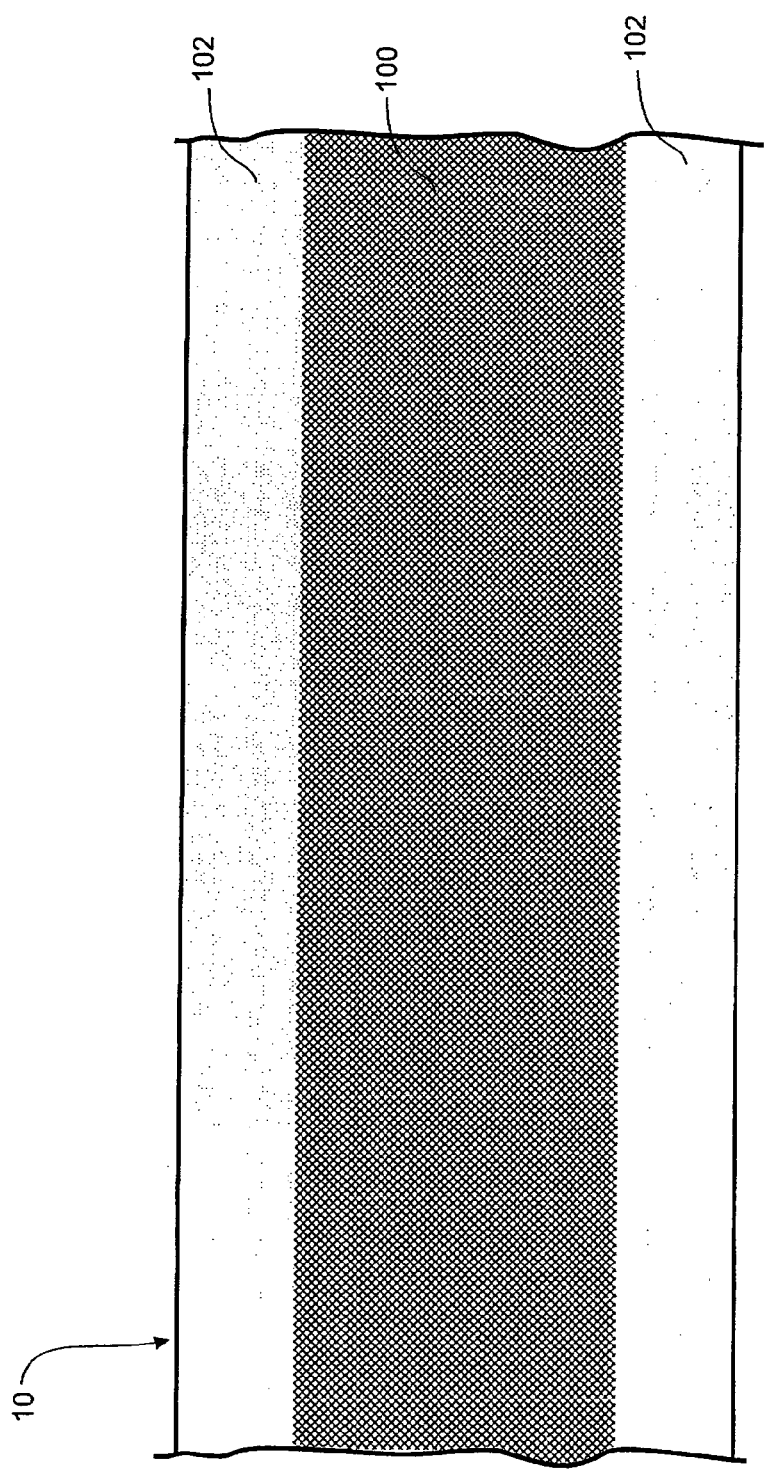
FIG. 10 is a view from perpendicular to the plane thereof of a flat length of material of a further embodiment.
Figure 11:
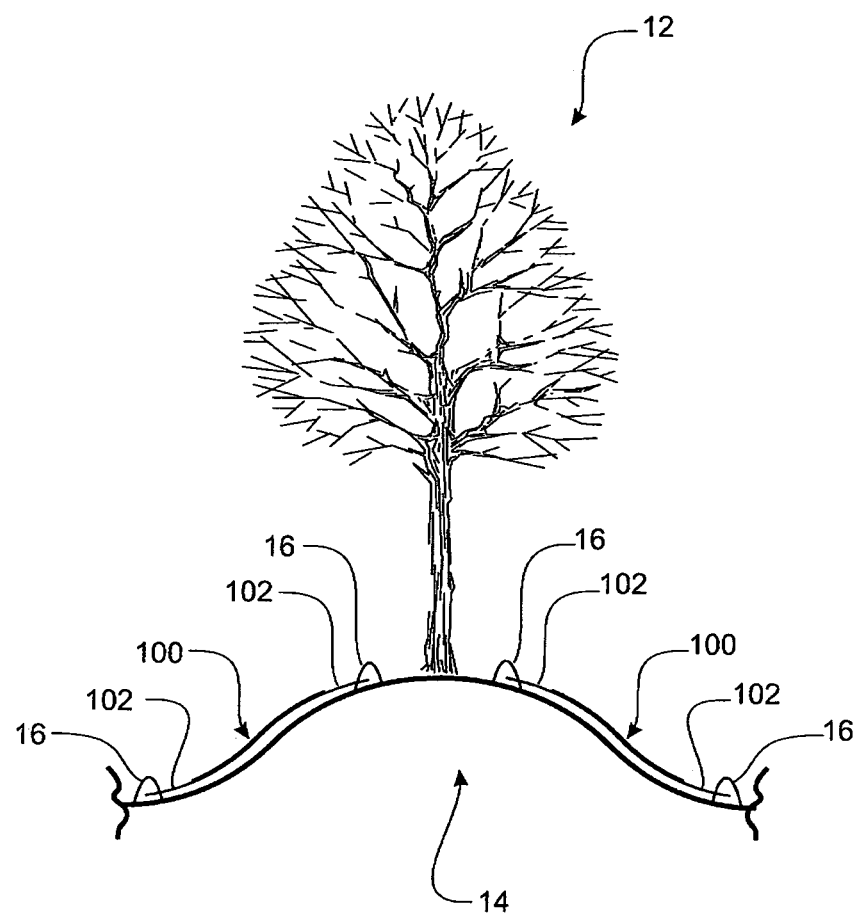
FIG. 11 is a view of lengths of material of FIG. 10 fixed to the ground on either side of a row of trees or crops growing on mounded soil.

In one embodiment some but not all of the warp tapes have increased thickness, and the warp tapes with increased thickness are spaced across the width of the fabric in one or more high water flow through groups. The lateral apertures between the warp and weft tapes in the longitudinally extending parts of the material comprising such group(s) of warp tapes of greater thickness, form one or more lengthwise parts of the material through which water can flow more readily than through other lengthwise parts of the material on either side of or between such high water flow through part(s) in which the warp tapes do not have the increased thickness relative to the weft tapes. FIG. 10 shows an example of such a material having a longitudinally extending centre part 100 in which some or all warp tapes have increased thickness relative to the weft tapes so that this centre section of the material has high water flow through. In the parts 102 on either side of the centre section the warp tapes have a similar thickness to the weft tapes. The lengthwise part 100 of the material may be wider across the length of the material than longitudinally extending side margins of the material. Typically the side margins of the material may have a width in the range 10 to 50 cm. Referring to FIG. 11, which is a view of two lengths of the ground cover material of this embodiment on either side of a row of trees or crops growing on mounded soil, the lengthwise extending parts 100 of the two lengths of material comprising thicker warp tapes may also have increased surface resistance of the material to rain or irrigation-sprinkler water flow down the material i.e. down either side of the mound shown, and tend to 'dam' or slow water flowing over the material. More water penetrates through the larger lateral apertures between the warp and weft tapes in these lengthwise high water flow through parts 100 of the material. The material may be designed to position these lengthwise parts of the material optimally to optimally position water penetration through the material for different applications of the material. Slower water run-off (judged when the material is flat on a sloping surface, of a consistent gradient) than over other lengthwise extending parts of the material, due to the rougher surface texture of the material in the high water flow through part(s) tends to enhance water penetration into the lateral water flow apertures WF onto the ground surface below. The rough surface texture of the material encourages water flow from rain or watering of the crops to penetrate the material.

Fibrillated Tape Embodiment

Figure 8:
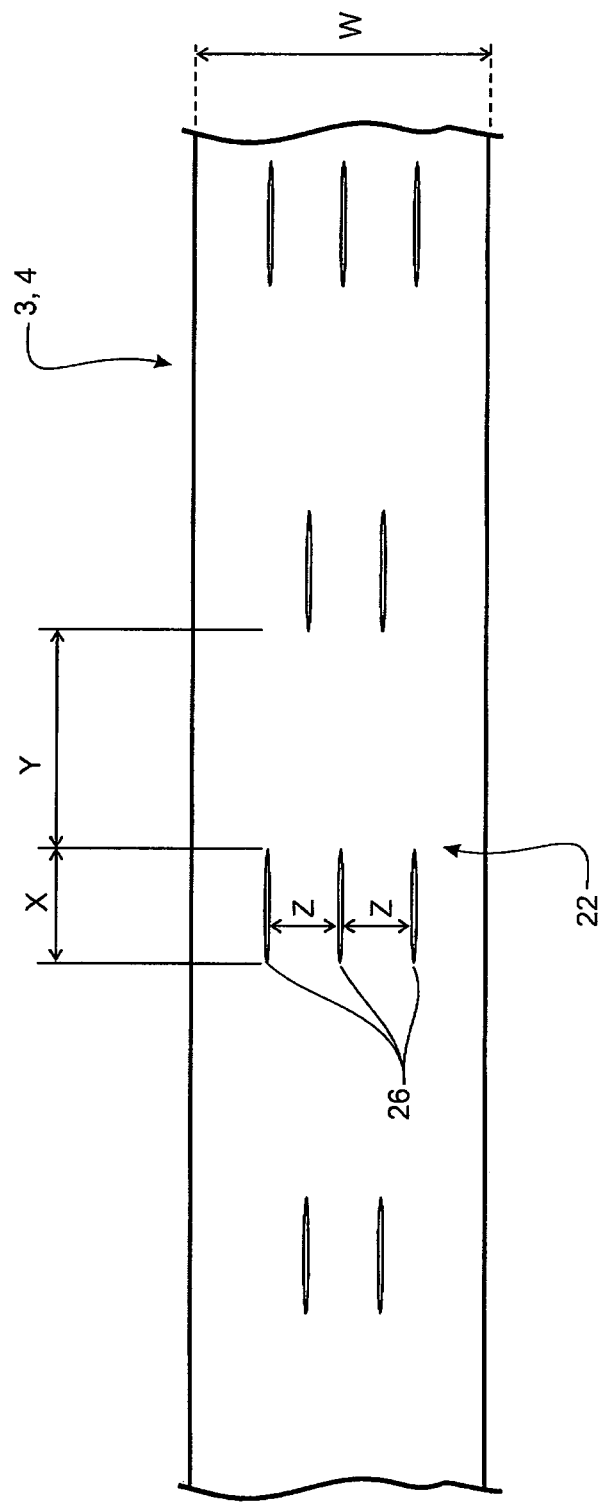
FIG. 8 is a plan view of a section of slit warp or weft tape that is used to weave another embodiment of a ground cover material of the invention.

FIG. 8 shows an example of the warp 3 and/or weft 4 tapes that can be used to weave another embodiment of the ground cover material. FIG. 8 shows the top surface 22 of a section of the length of the tape 3,4 in which slits 26 piercing through the tape are provided along the length of the tape ("fibrillation"), such tapes being referred to herein as "fibrillated tapes". In the preferred form, the tape 3, 4 comprise a series of spaced-apart slits 26 along the length of the tape. The orientation of the elongate slits is preferably substantially aligned with the longitudinal direction of the tape.

In one form, the tape 3, 4 may comprise a single series of slits along the length of the tape, but in alternative forms the tape may be comprise a series of slit groups, each slit group comprising two or more parallel or substantially parallel slits. For example, FIG. 8 shows the tape 3, 4 with a series of slit groups, each group comprising three parallel slits evenly spaced apart across the width (W) of the tape. As shown, each slits of each group are substantially aligned with corresponding slits in the adjacent slit groups of the series.

It will be appreciated that the slits need not necessarily be aligned lengthwise of the tape. They could alternatively be staggered across the width of the tape along its length to reduce any adverse effect on the strength of the tape. Any other slit pattern could alternatively be used, including random patterns along the length of the tape.

In the preferred form shown, the length of each slit, as designated by double-ended arrow X, is uniform along the length of the tape, although the length of the slits could vary in alternative forms. The slits or slit groups may be equi-spaced along the length of the tape 3, 4 by a distance designated by double-ended arrow Y, although non-equi-spacing could alternatively be employed in alternative forms.

The length (X) of the slits 26 are shorter than the full length of the tape and in some embodiments may be of length in the range of 1-20 mm, 5-15 mm, or 9-11 mm. The spacing of the slits depends on the slit length X, but in some embodiments may be in the range of 1-20 mm, 2-10 mm, or 4-6 mm. In one preferred form, the slit length X is approximately 10 mm with a spacing Y of approximately 5 mm. The spacing (designated by double-ended arrow Z) between the multiple slits across the width of the tape may be equal, and approximately 0.65 mm in one form when the overall tape width is 2.6 mm. In other forms the slits length X may be greater than the Y length.

The slits may be formed by passing the tapes through a roller with short blades extending radially from the periphery of the roller, which act to cut or pierce short slits into the tape as it passes beneath the roller (and between an adjacent nip roller or another similar slitting roller). The slits may be formed as simply cuts in the tape, generated by cutting the tape apart, or as narrow slots by cutting out tape material at each slit. Alternatively, any other technique for creating the fibrillated tapes may be employed during the tape manufacturing process or after initial manufacture of the tapes.

Figure 9:
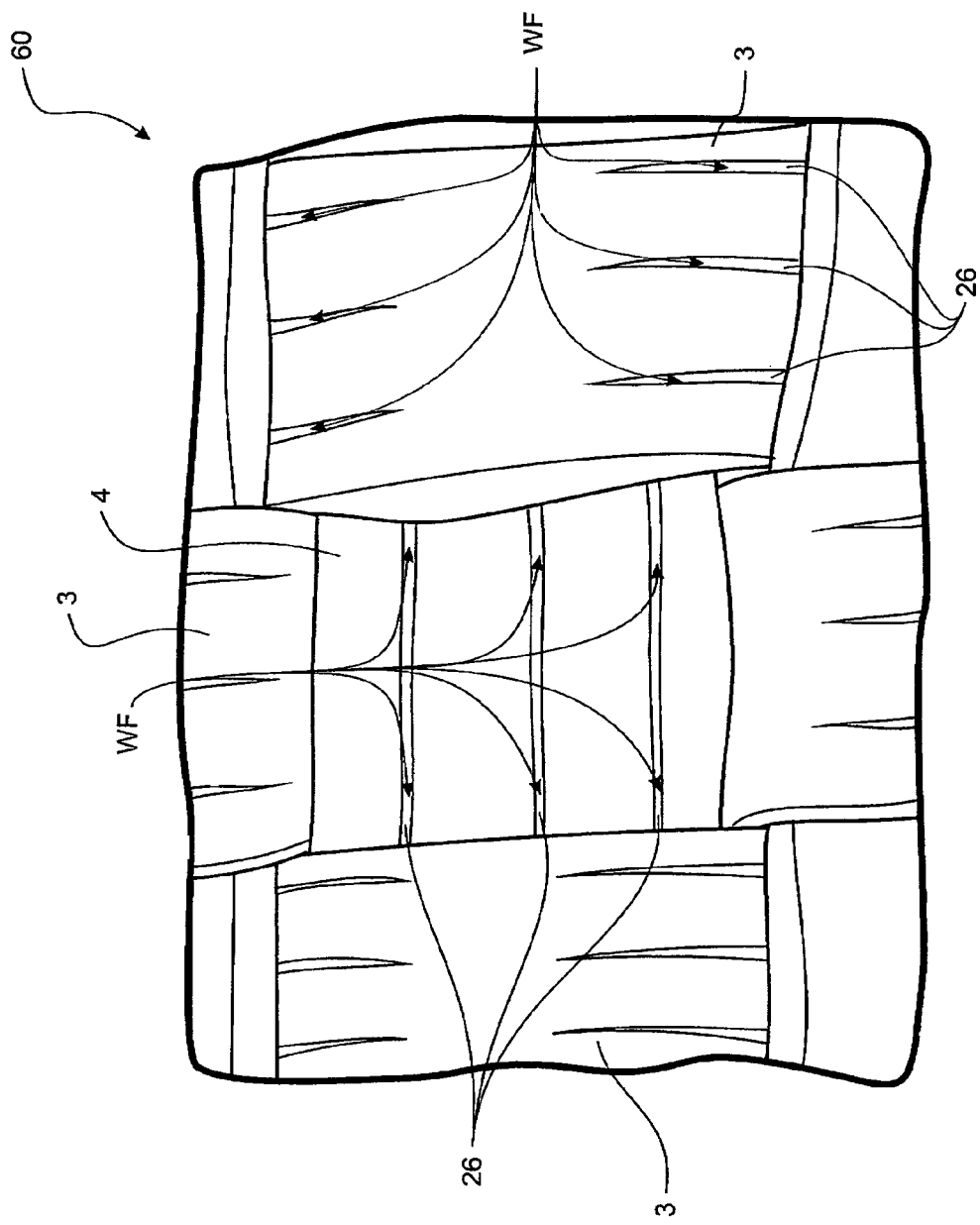
FIG. 9 is a very close up plan view of a section of the embodiment of the ground cover material that is woven with warp and/or weft tapes of the type shown in FIG. 7.

As mentioned, the fibrillated warp 3 and/or weft 4 tapes may be woven together to form another embodiment of the ground cover material 60 as shown in FIG. 9. FIG. 9 shows a close up view, similar to FIG. 5, of a section 4 ground cover material 60 woven from warp 3 and weft 4 tapes of similar width and thickness all warp and weft tapes 3,4 comprising a series of slits 26 lengthwise of the tapes in the form described with reference to FIG. 8. The slits 26 have a length shorter than the full length of the tapes 3, 4 and may have a length in the range referred to previously.

The slits 26 create additional lateral apertures through the weave of the material through which water may pass even when the material is tightly woven, as indicated by arrows WF in FIG. 9 for some of the slits by way of example.

In the form shown in FIG. 9, all the warp 3 and weft 4 tapes are fibrillated with slits. In alternative forms, slits may be provided in some or all of either the warp or weft tapes. For example, slits may be provided in every second or third of the warp and/or weft tapes or any other desired frequency or pattern.

The preferred form shown in FIG. 9 employs warp 3 and weft 4 tapes having substantially the same width (W) and thickness (T) profile. In alternative forms, fibrillated tapes having differential width and/or differential thickness as previously described can be used to weave the ground cover material. The use of tapes of differential width and/or differential thickness creates lateral water flow apertures at the weave crossings as previously described, and this may enhance water penetration through the material in combination with the apertures created by the slits. The material may also be woven with a weave of tightness such that the edges of the warp and weft tapes are at least butted, or are crammed against each other (as subsequently described further), In addition to allowing increased water penetration, the fibrillated tapes provide a woven ground cover material that has a rough surface texture relative to conventional ground cover materials woven from tapes without slits. This rough surface texture increases the surface resistance of the material to water flow over the material, which tends to result when the ground cover material is laid out on sloped or contoured surfaces as shown in FIGS. 3a and 3c for example. This slower water run-off tends to enhance water penetration into the lateral water flow apertures created by the slits and through the material onto the ground surface below. The rough surface texture of the material encourages water flow from rain or watering of the crops to penetrate the material through the slits rather than simply running off the surface of the material at its peripheral edges.

The fibrillated tapes may also tend to provide woven ground cover material that is softer and more deformable than conventional stiffer ground cover materials that are woven from non-slit tapes. This increased deformability may be advantageous when the ground cover material is employed to aid soil warmth retention, in addition to weed suppressing and/or light reflection. In soil warmth retention applications, the warp and weft tapes are often coloured black and heat from solar radiation is absorbed by the material and transmitted to the ground surface soil. Heat transfer via conduction tends to be more effective than by convection. Therefore, it is desirable for the ground cover material to substantially conform to the ground surface below, with minimum gaps or air space, to thereby maximise heat transfer to the ground soil by conduction. As the fibrillated tapes generate a softer more deformable woven ground cover material, the material is more likely to substantially conform in an abutting relationship to the ground surface underneath. Such deformability is particularly useful when the ground cover material is laid out over contoured, mounded or otherwise undulating ground surfaces, such as that shown in FIG. 3a.

Fibrillated tapes and tapes both fibrillated and twisted may be used as tapes of increased thickness in the differential tape thickness embodiment described above.

Differential Tape Density Embodiment

With reference to FIG. 1, another embodiment of the ground cover material is woven from warp and weft tapes having a similar width (W), but at least a major portion of the material comprises a higher density of weft tapes 4 relative to the warp tapes 3 per unit area or a higher density of warp tapes 3 relative to the weft tapes 4 per unit area.

By way of example only, a unit area for the material may be a square surface area of unit width (UW) 1-inch by unit length (UL) 1-inch, such that the unit area is inch$^2$.

In one embodiment, the density of the warp tapes 3 is such that the average number of tapes per unit area is substantially the quotient of the tape width by the UW of the unit area such that when woven the warp tapes butt against each with the tapes remaining flat and with minimal lengthwise folding of the tapes. The higher relative density of weft tapes 4 is such that it causes the weft tapes, once woven, to cram against each other so as to buckle or partially or completely fold and thereby increasing the apparent in-situ thickness (Ti) profile of the weft tapes and reducing the apparent in-situ width (Wi) profile of the weft tapes, relative to their flat rest profile.

The weaving process tends to apply greater stress or force to the weft tapes 4 more than the warp tapes 3 and this causes the weft tapes 4 to be weaker than the warp tapes 3, and the material tends to only be as strong as the tapes in the weakest direction. Increasing the density of the weft tapes relative to the warp tapes increases the strength of the material in the weft direction and thereby the overall strength of the material.

As mentioned, the cramming of the weft tapes 4 tends to cause the weft tapes to bow or completely fold along the length of the tape depending on the degree of cramming, and this results in an increased in-situ thickness (Ti) and reduced in-situ width (Wi) relative to the flat warp tapes 3. This bowing or folding thereby creates a thickness and width differential between the weft 4 and warp 3 tapes, and which creates lateral water flow apertures for increased water penetration as described previously with reference to the width and thickness tape differential embodiments.

Preferably, the ground cover sheet material comprises 5-30% more weft tapes than warp tapes per unit area, more preferably 10-25% more weft tapes than warp, tapes, and most preferably 15-20% more weft tapes than warp tapes.

By way of a numerical example, the weft 4 and warp 3 tapes in one embodiment may have a width (W) of approximately 2.6 mm. The ground cover material is woven such that there are approximately 10 warp tapes (1-inch/2.6 mm) per unit width (1-inch) such that the warp tapes 3 are woven substantially flat and abutting each other. Conventional ground cover materials would comprise the same average number of weft tapes per unit length, i.e. 10. However, in this embodiment a higher density of weft tapes 4 per unit length is employed, such as preferably at least 11, more preferably at least 12, and even more preferably at least 13 weft tapes per unit length so as to cram the weft tapes relative to the warp tapes. Some preferred ratios of warp:weft tapes per unit area comprise 10:11 or 10:12 or 10:13, for example.

While this differential density embodiment preferably employs a higher density of weft tapes relative to warp tapes because of the reduced strength of the weft tapes as a result of the weaving process, other embodiments may comprise a higher density of warp tapes relative to weft tapes, and the same proportions and ratios above apply. In such embodiments, the density differential is primarily employed to create an in-situ tape width and thickness differential to create the lateral water flow apertures.

Crammed Tapes Embodiment

In other embodiments, the tapes are woven to cram against each other so that some or a majority or substantially all of both the warp and weft tapes buckle or partially or completely fold against each other, thereby increasing the apparent in-situ thickness (Ti) profile of the tapes and reducing the apparent in-situ width (Wi) profile of the tapes, relative to their flat rest profile, without differential tape width or thickness or fibrillation of some or all of the tapes. Such an embodiment may be said to comprise a ground cover sheet material woven from warp and weft tapes of a plastics material, the warp and weft tapes having substantially the same width, wherein at a majority or substantially all of crossings of warp and weft tapes the warp and/or weft tapes are partly folded lengthwise. This creates water flow apertures WF either side of warp-weft tape intersections between warp and weft tapes of the different cross-section shape, through which water can flow at the warp and weft tape crossings, while again viewed from a direction perpendicular to the plane of the material, the material has minimal porosity and few if any apertures through the material are apparent, so that the material is highly effective as a weed suppressant, or in a reflective application provides a maximum reflective surface area, or may be useful for both.

Flat Tapes-Monofilament Tapes Embodiment

Another embodiment of a ground cover sheet material of the invention is woven from warp or weft tapes of a plastics material some or a majority or substantially all having a rectangular or square cross-section and weft or warp tapes of a plastics material and some or a majority or substantially all having a circular or oval cross-section, without differential tape width or thickness or density or fibrillation or cramming of some or all of the tapes. The different cross-section shapes of at least some warp tapes and at least some weft tapes creates water flow apertures WF either side of warp-weft tape intersections between warp and weft tapes of the different cross-section shape, through which water can flow at the warp and weft tape crossings, while again viewed from a direction perpendicular to the plane of the material, the material has minimal porosity and few if any apertures through the material are apparent, so that the material is highly effective as a weed suppressant, or in a reflective application provides a maximum reflective surface area, or may be useful for both.

Selective High Flow Embodiment

Described previously with reference to FIGS. 10 and 11 is an embodiment in which some or all of the warp tapes have increased thickness with the warp tapes with increased thickness being spaced across the width of the fabric in one or more high water flow through groups. The lateral apertures between the warp and weft tapes in the longitudinally extending parts of the material comprising such group(s) of warp tapes of greater thickness, form one or more lengthwise parts of the material through which water can flow more readily than through other lengthwise parts of the material on either side of or between such high water flow through part(s) in which the warp tapes do not have the increased thickness relative to the weft tapes.

In other embodiments such a longitudinally extending high water flow through part or parts of the material may, alternatively be formed by weaving such part(s) of the material, such as centre part 100 in FIG. 10, with warp tapes that are wider (as in the embodiment of FIG. 5) than the warp tapes in other parts such as parts 102, or by weaving the longitudinally extending high water flow through part or parts with warp tapes which are fibrillated (as in the embodiment of FIGS. 8 and 9), or by weaving with higher density or by tape butting or cramming in the high water flow through parts, or any combination which will achieve a higher water flow through in the longitudinally extending high water flow through part or parts relative to other parts of the material.

Figure 12:
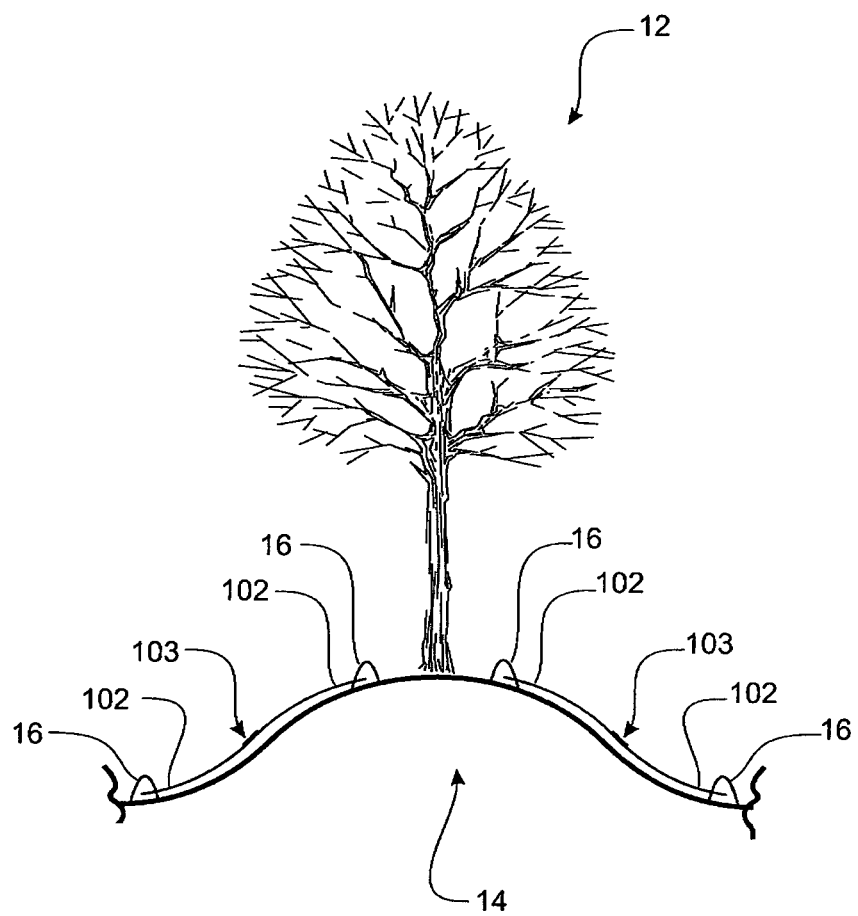
FIG. 12 is a view similar to FIG. 11 of lengths of material but of a different form to those of FIG. 11, fixed to the ground on either side of a row of trees or crops growing on mounded soil.

FIGS. 10 and 11 show an embodiment with a single such centrally extending high water flow part 100 having a width across the material over half the width of the material, while on FIG. 2 are marked two narrower and spaced such high water flow parts 100, each less than one quarter of the width of the material. FIG. 12 is a view similar to FIG. 11 of lengths of material but of a different form to those of FIG. 11, fixed to the ground on either side of a row of trees or crops growing on mounded soil. In FIG. 12 the same reference numerals indicate the same elements unless indicated otherwise. A lengthwise extending part 103 which may be as narrow as a single warp tape and has a thickness greater than the other warp tapes which may not or may themselves be of greater thickness than the weft tapes as described previously. The increased thickness tape 103 may have a damming effect on water flow over the material so that water is slowed or dammed at tape 103 and will penetrate through lateral water flow apertures WF on either side of the tape 103 onto the ground below. In a further alternative form part 103 may comprise more than a single tape of increased thickness such as 2 to for example 20 adjacent warp tapes or a lengthwise extending part of the material in which every alternate warp tape is a thicker warp tape for example, and two or more such spaced lengthwise parts 103 as described may be formed in the material.

Figure 13:
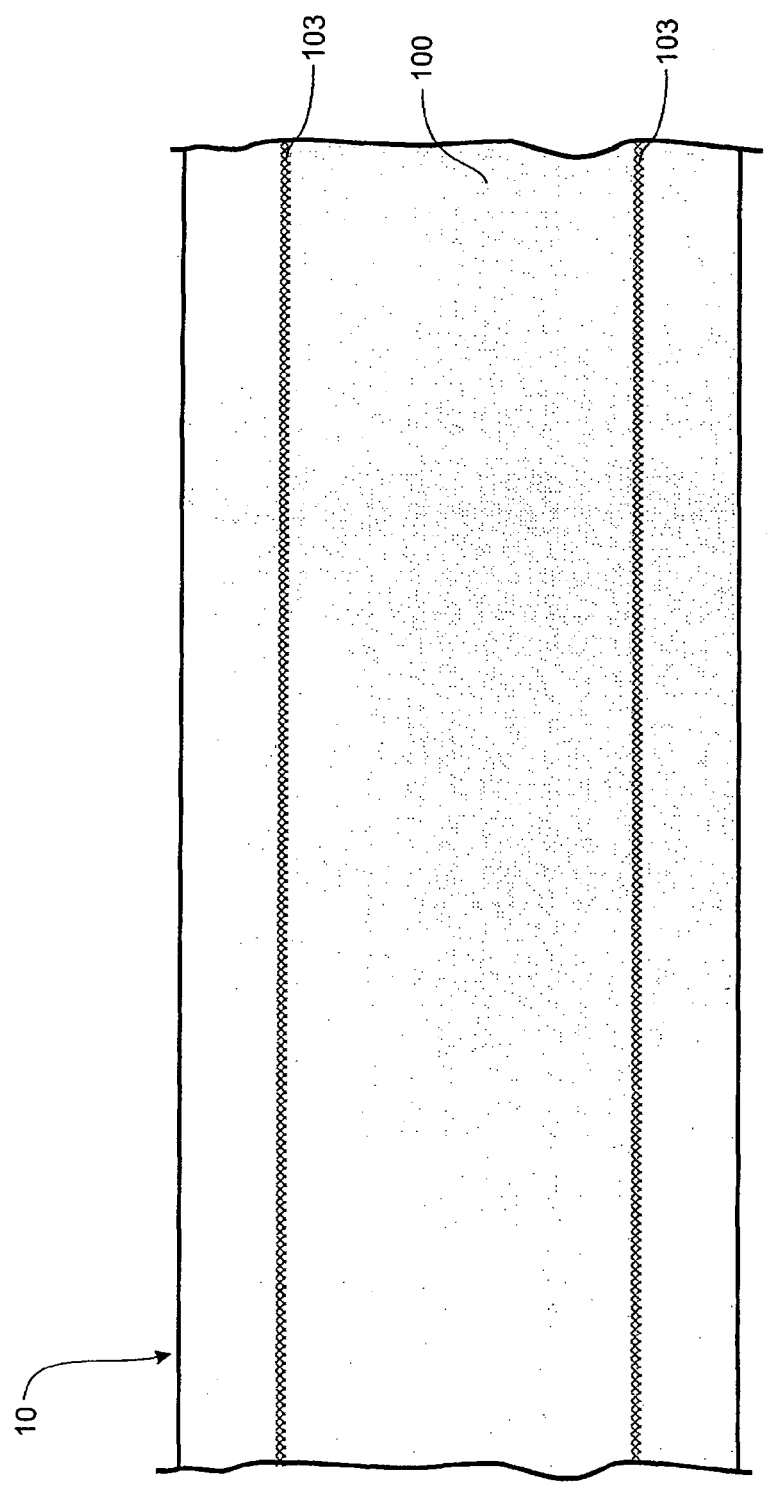
FIG. 13 is a view from perpendicular to the plane thereof of a flat length of material similar to FIG. 10 but of another embodiment.

FIG. 13 is a view similar to FIG. 10 from perpendicular to the plane thereof of a flat length of material of another form of this embodiment. All or a major part of the area of the material may be formed a high water through flow part 100 as described above. Two parts 103 which again may each be as narrow as a single warp tape have a thickness greater than the other warp tapes which may themselves be of greater thickness than the weft tapes as described previously. Even greater thickness of the tapes 103 may be achieved as described in relation to the differential tape thickness embodiment above and may comprise for example a tape comprising multiple filaments as previously described then twisted along its length so as to be of further increased thickness, a thicker tape of circular or oval cross-section, or similar. Again even such a single increased thickness tape 103 may have a damming effect on water flow over the material, and water further slowed or dammed at tape or tapes 103 will penetrate through lateral water flow apertures WF on either side of the tape(s) 103 onto the ground below. In a further alternative form each part 103 may comprise more than a single tape of increased thickness such as 2 to for example 20 adjacent warp tapes or a lengthwise extending part of the material in which every alternate warp tape is a thicker warp tape for example.

Other Embodiments and Features

The following aspects and features may optionally be applied to any one or more of the above embodiments.

Optionally the width of warp tapes in the side margins of the material may be reduced to increase the side margin strength of the material, to increase resistance to tearing, so that when prongs of a fastening claw or ground staples or similar devices penetrate the material the hole(s) formed will not enlarge easily, to form a more secure connection.

The foregoing describes the invention including preferred forms thereof. Alterations and modifications as will be obvious to those skilled in the art are intended to be incorporated in the scope hereof as defined in the accompanying claims.

The invention claimed is:

1. A ground cover sheet material having greater length than width and woven from warp and weft tapes of a plastics material wherein at a majority of crossings of warp and weft tapes the warp tapes are partly folded lengthwise in one or more high water flow through-lengthwise extending parts of the material than in other lengthwise extending parts of the material on either side of said high water flow through-lengthwise extending part(s), so that said one or more high water flow through-lengthwise extending part(s) of the material has/have a rougher surface texture over which water will move more slowly when the material is flat on a sloping surface, of a consistent gradient, and through which water may flow or flow more freely, than over and through said one or more other lengthwise extending part(s) of the material.

2. A ground cover sheet material according to claim 1 wherein substantially all of the warp tapes in said lengthwise extending parts of the material are partly folded lengthwise.

3. A ground cover sheet material according to claim 1 wherein at substantially all crossings of warp and weft tapes, the warp and weft tapes are butted against each other.

4. A ground cover sheet material according to claim 1 wherein at said crossings of warp and weft tapes the warp and weft tapes are crammed against each other.

5. A ground cover sheet material according to claim 4 wherein at substantially all crossings of warp and weft tapes, the warp and weft tapes are butted against each other such that at least some of the warp tapes are partly folded lengthwise.

6. A ground cover sheet material having a greater length than width and woven from warp and weft tapes of a plastics material, some of the warp tapes having a circular or oval cross-section in one or more high water flow through-lengthwise extending parts of the material greater than a corresponding cross-sectional dimension of other of the warp tapes in other lengthwise extending parts of the material on either side of said high water flow through-lengthwise extending part(s), so that said one or more high water flow through-lengthwise extending part(s) of the material has/have a rougher surface texture over which water will move more slowly when the material is flat on a sloping surface, of a consistent gradient, and through which water may flow or flow more freely, than over and through said one or more other lengthwise extending part(s) of the material.

7. A ground cover sheet material having a greater length than width and woven from warp and weft tapes of a plastics material wherein some of the warp tapes have a greater thickness in one or more high water flow through-lengthwise extending parts of the material than other of the warp tapes in other lengthwise extending parts of the material on either side of said high water flow through-lengthwise extending part(s), so that said one or more high water flow through-lengthwise extending part(s) of the material has/have a rougher surface texture over which water will move more slowly when the material is flat on a sloping surface, of a consistent gradient, and through which water may flow or flow more freely, than over and through said one or more other lengthwise extending part(s) of the material.

8. A ground cover sheet material according to claim 6 wherein the balance of the warp tapes and the weft tapes have a rectangular or, square cross-section.

9. A ground cover material according to claim 6 wherein at least some of the warp tapes have a greater thickness than the weft tapes.

10. A ground cover sheet material according to claim 1 wherein at least some of the warp and/or weft tapes comprise slits through the tapes lengthwise of the tapes.

11. A ground cover sheet material according to claim 6 wherein at least some of the warp and/or weft tapes comprise slits through the tapes lengthwise of the tapes.

12. A ground cover sheet material according to claim 1 and wherein the material has a porosity of less than 10%.

13. A ground cover sheet material according to claim 6 and wherein the material has a porosity of less than 10%.

14. A ground cover sheet material according to claim 1 and wherein the material is reflective of at least 50% of visible light on at least one side of the material.

15. A ground cover sheet material according to claim 6 and wherein the material is reflective of at least 50% of visible light on at least one side of the material.

16. A ground cover sheet material according to claim 1 and wherein the material is reflective of at least 40% solar radiation on average across the UV (wavelength about 280-400 nm), visible (wavelength about 400-700 nm) and very near infrared (wavelength about 700-800 nm) ranges, and which transmits at least 10% or 5% on average of solar radiation across the wavelength range about 800-2500 nm.

17. A ground cover sheet material according to claim 6 and wherein the material is reflective of at least 40% solar radiation on average across the UV (wavelength about 280-400 nm), visible (wavelength about 400-700 nm) and very near infrared (wavelength about 700-800 nm) ranges, and which transmits at least 10% or 5% on average of solar radiation across the wavelength range about 800-2500 nm.

18. A ground cover sheet material according to claim 1 wherein some or all of the tapes are formed from a resin comprising a white pigment.

19. A ground cover sheet material according to claim 6 wherein some or all of the tapes are formed from a resin comprising a white pigment.

20. A ground cover sheet material according to claim 7 wherein the greater thickness warp tapes have a rectangular cross-section having a cross-section dimension greater than a corresponding cross-sectional dimension of other of the warp tapes.

21. A ground cover sheet material according to claim 20 wherein the balance of the warp tapes and the weft tapes have a rectangular or square cross-section.

22. A ground cover sheet material woven according to claim 7 wherein said high water flow through longitudinally centrally extending lengthwise part of the material is wider across the length of the material than the lengthwise extending side parts of the material.

23. A ground cover sheet material woven according to claim 22 wherein said lengthwise extending side parts of the material have a width in the range 10 to 50 cm.

24. A ground cover material according to claim 7 wherein also at least some of the warp tapes have a greater thickness than the weft tapes.

25. A ground cover material according to claim 24 wherein also a major fraction of the warp tapes have a greater thickness than the weft tapes.

26. A ground cover material according to claim 24 wherein also substantially all of the warp tapes have a greater thickness than the weft tapes.

27. A ground cover sheet material according claim 24 wherein the thickness of the warp tapes is at least 50% greater than the thickness of the weft tapes.

28. A ground cover sheet material according to claim 24 wherein the thickness of the warp tapes is at least 100% greater than the thickness of the weft tapes.

29. A ground cover sheet material according to claim 24 wherein the thickness of the warp tapes is one to ten times or more greater than the thickness of the weft tapes.

30. A ground cover sheet material according to claim 7 wherein the warp tapes with greater thickness comprise multiple individual filaments.

31. A ground cover sheet material according to claim 30 wherein the warp tapes with greater thickness are composed of between 2 and 12 individual filaments.

32. A ground cover sheet material according to claim 30 wherein the warp tapes with greater thickness are composed of between 4 and 8 individual filaments.

33. A ground cover sheet material according to claim 30 wherein the warp tapes with greater thickness are composed of 5 or 6 individual filaments.

34. A ground cover sheet material according to claim 24 wherein the warp tapes with greater thickness are twisted along their length.

35. A ground cover sheet material according to claim 24 wherein the warp tapes with greater thickness are stacked along their length.

36. A ground cover sheet material according to claim 7 wherein at least some of the warp and/or weft tapes comprise slits through the tapes lengthwise of the tapes.

37. A ground cover sheet material according claim 7 wherein the material has a porosity of less than 10%.

38. A ground cover sheet material according claim 7 wherein the material is reflective of at least 50% of visible light on at least one side of the material.

39. A ground cover sheet material according to claim 7 and wherein the material is reflective of at least 40% solar radiation on average across the UV (wavelength about 280-400 nm), visible (wavelength about 400-700 nm) and very near infrared (wavelength about 700-800 nm) ranges, and which transmits at least 10% or 5% on average of solar radiation across the wavelength range about 800-2500 nm.

40. A ground cover sheet material according to claim 7 wherein some or all of the tapes are formed from a resin comprising a white pigment.

* * * * *